(12) United States Patent
Bloom et al.

(10) Patent No.: US 7,992,904 B2
(45) Date of Patent: Aug. 9, 2011

(54) SEALING MECHANISM FOR DUCTWORK

(75) Inventors: Vincent L. Bloom, Beallsville, PA (US); Douglas G. Gudenburr, Finleyville, PA (US); Christopher A. Armstrong, Brownsville, PA (US); Andrew J. Male, Export, PA (US)

(73) Assignee: Ductmate Industries, Inc., East Monongahela, PA (US)

( * ) Notice: Subject to any disclaimer, the term of this patent is extended or adjusted under 35 U.S.C. 154(b) by 253 days.

(21) Appl. No.: 12/133,482

(22) Filed: Jun. 5, 2008

(65) Prior Publication Data

US 2008/0303276 A1    Dec. 11, 2008

Related U.S. Application Data

(60) Provisional application No. 60/942,412, filed on Jun. 6, 2007.

(51) Int. Cl.
*F16L 9/02* (2006.01)
(52) U.S. Cl. .......................... 285/424; 138/164; 138/166
(58) Field of Classification Search .................. 285/424, 285/374, 305; 138/162, 164, 163, 166, 168
See application file for complete search history.

(56) References Cited

U.S. PATENT DOCUMENTS

| | | | |
|---|---|---|---|
| 467,999 A | 2/1892 | Southard | |
| 572,076 A * | 11/1896 | Smith | 285/374 |
| 701,468 A | 6/1902 | Clausing | |
| 1,152,568 A * | 9/1915 | Stearns | 285/305 |
| 1,308,981 A * | 7/1919 | Buller | 285/305 |
| 1,324,602 A * | 12/1919 | Lorenz | 285/305 |
| 1,429,822 A * | 9/1922 | Acer | 285/305 |
| 1,935,690 A | 11/1933 | Zack | |
| 2,038,389 A | 4/1936 | Siebenlist | |
| 2,147,775 A | 2/1939 | Miller et al. | |
| 2,225,556 A | 12/1940 | Delaney | |
| 2,866,481 A | 12/1958 | Bratsch | |
| 2,936,184 A * | 5/1960 | Epstein | 285/305 |
| 3,146,950 A | 9/1964 | Lancaster | |
| 3,170,544 A * | 2/1965 | Kinkead et al. | 285/305 |
| 3,246,918 A | 4/1966 | Burghart | |
| 3,315,970 A * | 4/1967 | Holoway | 285/374 |
| 3,369,568 A | 2/1968 | Davis et al. | |
| 3,848,308 A * | 11/1974 | Kaval | 29/890.149 |
| 4,018,461 A | 4/1977 | Bram | |
| 4,040,651 A | 8/1977 | LaBranche | |
| 4,082,322 A * | 4/1978 | Lever | 285/123.16 |
| 4,099,747 A * | 7/1978 | Meserole | 285/424 |
| 4,218,079 A | 8/1980 | Arnoldt | |
| 4,820,569 A | 4/1989 | Hinden | |

(Continued)

FOREIGN PATENT DOCUMENTS

DE    200 10 253 U1    8/2000

OTHER PUBLICATIONS

Q-41-20 Robofoam Mastic Sealant, Q'SO Product Data, Dec. 1997, Q'SO Incorporated, Saginaw.

(Continued)

*Primary Examiner* — David E Bochna
(74) *Attorney, Agent, or Firm* — Beck & Thomas, P.C.

(57) ABSTRACT

HVAC ductwork should be sealed along its joints in order to reduce air leakage. The ductwork can be sealed by the combination of a gasket and mechanical locking mechanism.

10 Claims, 6 Drawing Sheets

U.S. PATENT DOCUMENTS

| | | | |
|---|---|---|---|
| 4,846,147 A * | 7/1989 | Townsend et al. | 285/424 |
| 4,865,890 A | 9/1989 | Erlichman | |
| 4,874,191 A * | 10/1989 | Green | 285/424 |
| 4,902,049 A * | 2/1990 | Umehara | 285/424 |
| 4,930,815 A * | 6/1990 | Tuggler, Jr. | 285/424 |
| 4,941,693 A | 7/1990 | Spaude et al. | |
| 5,195,789 A | 3/1993 | Walsh et al. | |
| 5,346,264 A | 9/1994 | Law et al. | |
| 5,393,106 A * | 2/1995 | Schroeder | 285/424 |
| 5,505,230 A | 4/1996 | Bartholomew | |
| 5,662,360 A | 9/1997 | Guzowski | |
| 6,026,803 A * | 2/2000 | Wawrla | 285/424 |
| 6,062,608 A * | 5/2000 | Gerth | 285/424 |
| 6,244,633 B1 * | 6/2001 | Warren | 285/424 |
| 6,279,967 B1 | 8/2001 | Proctor et al. | |
| 6,431,609 B1 * | 8/2002 | Andersson | 285/424 |
| 6,634,352 B2 * | 10/2003 | Maiello | 285/361 |
| 6,640,461 B1 * | 11/2003 | Berger | 285/305 |
| 6,739,632 B1 | 5/2004 | Thomas et al. | |
| 6,866,308 B2 * | 3/2005 | Issagholian-Havai | 285/374 |
| 7,125,054 B2 | 10/2006 | Jones | |
| 7,347,224 B2 * | 3/2008 | Nohara et al. | 285/424 |
| 7,393,021 B1 * | 7/2008 | Lukjan | 285/424 |
| 7,708,034 B2 * | 5/2010 | Gudenburr et al. | 285/424 |
| 2001/0026048 A1 | 10/2001 | Proctor et al. | |
| 2003/0108381 A1 | 6/2003 | Walsh et al. | |
| 2004/0218975 A1 | 11/2004 | Walsh et al. | |

OTHER PUBLICATIONS

The Modern Way to Seal Ductwork, Autosealer, Ductmate Industries, Inc., Mar. 6, 1986, pp. 1-6, United States of America.

T1 The New Standard for Round Air Ducts, SNIPS magazine, Apr. 2006, BNP Media, Troy, MI.

James Gerard, Declaration of James Gerard 37 CFR 1.132, May 21, 2007, pp. 1-2, Pittsburgh.

* cited by examiner

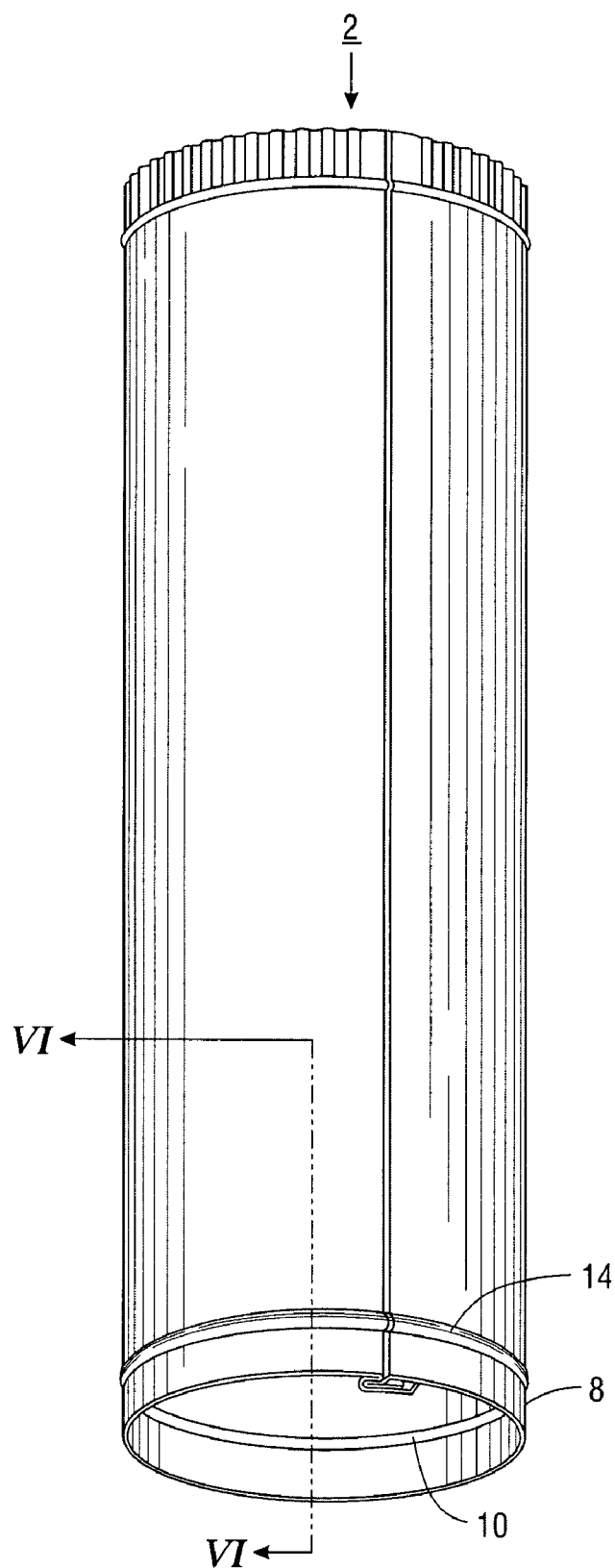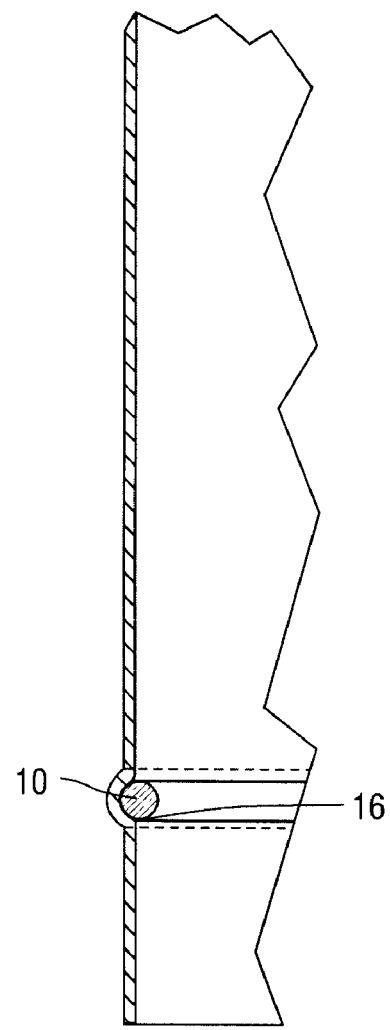
Fig.5
Fig.6

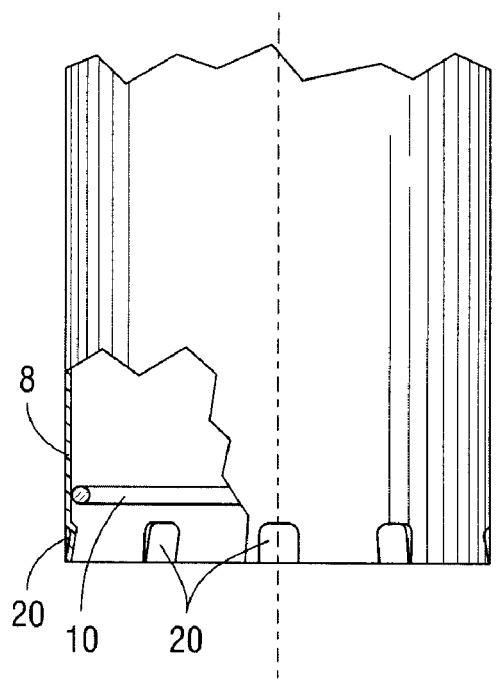
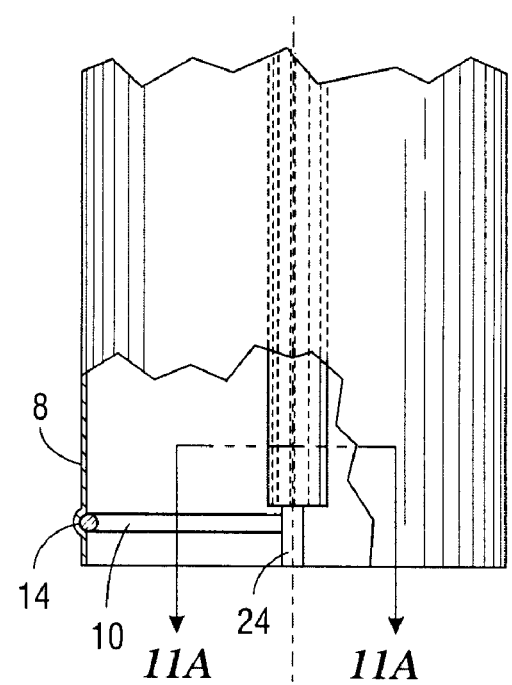
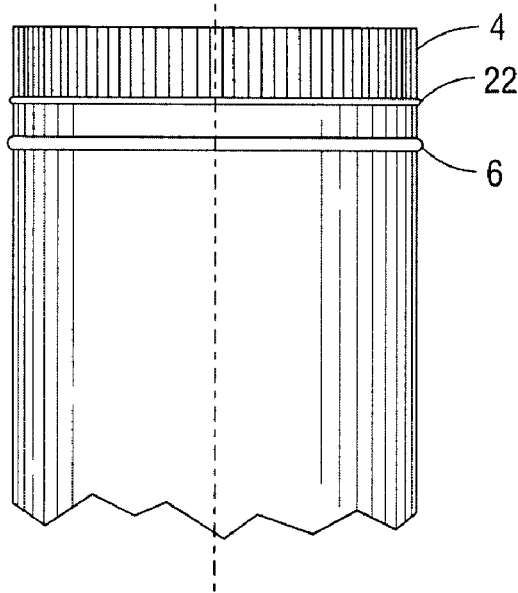
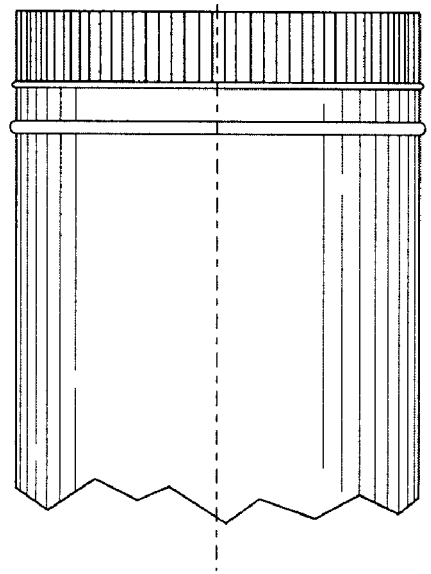
Fig.10   Fig.11
Fig.11A

__US 7,992,904 B2__

SEALING MECHANISM FOR DUCTWORK

CROSS REFERENCE TO RELATED APPLICATION

This application claims the benefit of U.S. Provisional Application No. 60/942,412, filed Jun. 6, 2007 which is hereby incorporated by reference in its entirety.

BACKGROUND OF THE INVENTION

1. Field of the Invention

This invention generally relates to a connection for HVAC ductwork. This invention specifically relates to a sealing mechanism for HVAC ductwork that reduces air leakage in joints.

2. Description of the Related Art

Traditional ductwork has air leakage at the joints. There has been a need to add a gasket material to the joints so that when the ductwork is connected little leakage occurs. However to be able to add a gasketing material during the manufacturing process the gasketing material would have to have the following properties:

1) Good adhesion to sheet metal;
2) Minimal surface tack; and
3) Short curing time.

There are numerous materials that have two out of the three qualities listed above but it is very difficult to find one having all three. Therefore, adding a gasketing material to the manufacturing process has been impractical. Typically in ductwork manufacturing it would take three seconds to form the longitudinal seam and then roll the sheet metal duct for shipping. As an example of how traditional gasketing materials would make the manufacturing process difficult one could look at adding a sealant that does not set up quickly. The sealant would have good adhesion to galvanized steel and little surface tack but does not set up quickly. It could take two to three hours or two to three days for the gasketing material to set up or cure. This length of time is not practical as either one would have to wait for each individual sheet to cure or you would have to have some type of stacking systems where the sheets are not touching each other. This would make volume manufacturing in a timely fashion impossible. Additionally, if the material sets up quickly but has too much surface tack it will cause problems in the shipping when the ducts are nested together.

U.S. Pat. No. 6,325,389 entitled a Self Sealing Duct/Fitting Connector describes the problems in the prior art with Conventional HVAC systems. It describes the air leakage at the joints with traditional ductwork. The solution in U.S. Pat. No. 6,325,389 is a special connector for the ductwork with a sealant.

There is need for sealing the connections between ductwork without having a special fitting that is incorporated in the connections manufactured into the duct work.

SUMMARY OF THE INVENTION

This invention provides for a round metal heating ventilation and air conditioning duct for residential or commercial use having a gasket that adheres to the sheet metal and has minimal surface tack. The round metal duct is made from sheet metal and used for the transportation of heated air, air, or cooled air from one location to another. The duct has a male end which is crimped and has a bead on one end of the round duct. The male end is to be inserted into a corresponding female end of another round duct. The duct also has a female end on an opposite end of the round duct to receive a corresponding male end of another round duct.

The gasket may be provided in a first state and can then be cured. The curing process can include an agent and may be complete in 20 minutes or less. Additionally, the gasket may be foamed.

The entire process of making the duct could take 20 minutes or less.

The cured gasket adheres to the duct proximate to an end of the duct.

This invention also provides for the use of ultraviolet light to quicken the curing of the gasketing material. The gasketing material could also be foamed.

The gasketing material can be located:

1) on a leading edge of the male bead;
2) on the inside of the sheet proximate to the female end;
3) on an inside of the female bead; or
4) on an inside of a flared portion of the female end.

This invention also provided for a method of manufacturing round sheet metal ducts. Sheet metal is provided. A female end is formed on one end of the sheet metal. The female end is capable of receiving a male end of a different piece of ductwork. A male bead is formed on the male end of the duct. A longitudinal snap locking mechanism on corresponding longitudinal sides of the sheet metal is formed so that when the snap locking mechanism is connected a duct is created.

BRIEF DESCRIPTION OF THE DRAWINGS

FIG. 5 is an isometric view of a single section of round ductwork showing a female end of the ductwork having a bead.

FIG. 6 is a section view of a female end of the ductwork having a bead along section VI-VI.

FIG. 10 shows a first embodiment of a female transverse positioning lock and a male transverse positioning lock.

FIG. 11 shows a second embodiment of a female transverse positioning lock and a male transverse positioning lock.

Figures 1, 2:
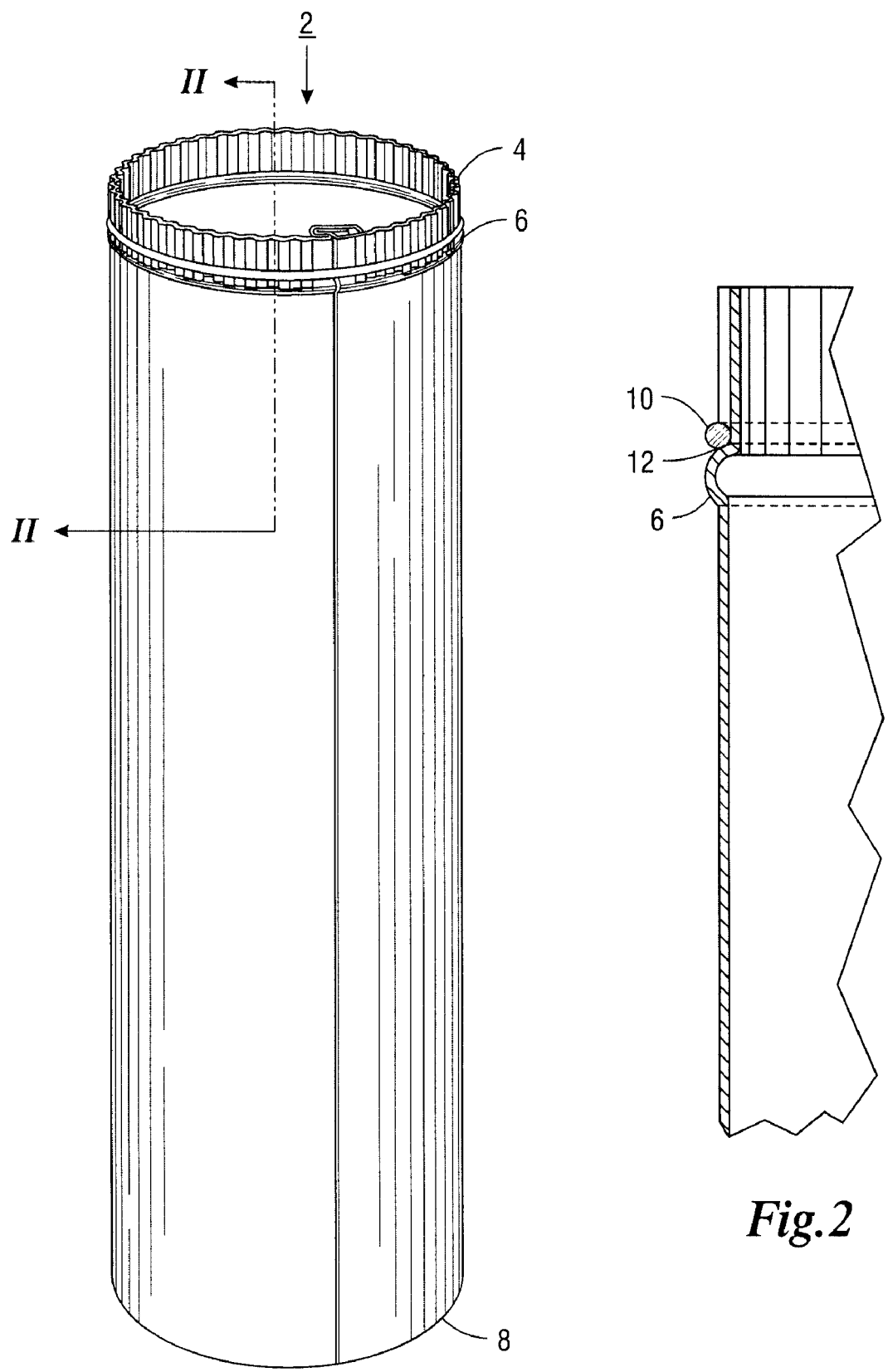
FIG. 1 is an isometric view of a single section of round ductwork showing a male end of a section of round ductwork.
FIG. 2 is a section view of a male end of the ductwork along section II-II.

F*ig*. 11 A is a section view of a longitudinal snap locking mechanism.

FIG. 11 shows a second embodiment of a transverse positioning lock. The female end 8 of the duct has a female bead 14. The female end has a cut out 24 on the longitudinal seam. The combination of the female bead 14 and the cut out 24 in this embodiment is the female transverse positioning lock. The longitudinal snap locking mechanism can be seen in FIG. 11A. A female part 26 of the longitudinal snap locking mechanism is removed up until the female bead 14 to create the cut out 24. The crimped male end 4 has a second bead 22 which in this embodiment is the male transverse positioning lock. The crimped male end 4 fits into the female end so that the second bead 22 slides into female bead 14 and locks the pipes together and ensures that the gasket lines up correctly and creates a proper seal. The cut out 24 allows the duct to radially expand or contract.

DETAILED DESCRIPTION OF A PREFERRED EMBODIMENT

Definitions

"round metal heating ventilation and air conditioning duct for residential or commercial use"—A cylindrical tube used to transport air—this includes spiral, round and oval ducts.

"forming a male crimped end and a female"—creating two ends used to connect ductwork together in the sheet metal.

"forming a longitudinal latching system on the sheet metal duct"—creating a mechanism in the sheet metal to connect ends of the duct so that it creates a round metal duct.

"gasket"—any type of sealing material that reduces air leakage between the joints formed in the ductwork. This would include a preformed product that has a tape on it and can be applied to the duct. Loctite nuva sil 5039 is an example of cured gasket material.

"cured"—process by which gasket hardens or toughens or turns into a gasket. Can be cross linking of polymer chains.

"first state" means any pre-cured state. Could be a liquid or other state of polymer or other material prior to reaching its final hardened or cured state as a gasket.

"adheres to the sheet metal"—attaching to the sheet metal.

"minimal surface tack"—When ducts are shipped they are nested against other ducts. The surface tack would be such that the ducts would not stick together and/or would not damage the gasket. This could be accomplished by putting a tape material on one side of the gasket. A gasket with a tape would be a gasket with minimal surface tack. Also an uncovered gasket that does not stick to other ducts would be a gasket with minimal surface tack.

"Ultraviolet"—(UV) light is electromagnetic radiation with a wavelength shorter than that of visible light, but longer than soft X-rays. It is so named because the spectrum consists of electromagnetic waves with frequencies higher than those that humans identify as the color violet.

"foamed"—injecting some gas or blowing agent causing the gasket to grow creating bubbles in gasket causing the gasket to be more compressible. A gasketing material that has gas bubbles. A Nordson foam mixer could be used to foam the gasketing material. It is desirable to foam the gasket because less gasket material can be used. If it is foamed at 50% then 50% less gasket material is used.

"sealed joint" means a ductwork joint that has less leakage than a ductwork joint without a gasket.

"ductwork"—includes other straight pieces of duct and all types of fittings.

"round metal duct"—a cylindrical tube used to transport air.

"male end"—designed with a projecting part for fitting into a corresponding female part.

"female end"—designed to be hollow or have a groove into which a corresponding male part fits.

"a bead"—an impression formed into sheet metal.

"a longitudinal snap locking mechanism"—something that allows two ends of duct to be joined together without a separate fastener. Examples of this are button lock and a reeves lock.

"sheet metal duct"—Any type of duct work.

"applying an agent"—Using an agent as to aid in the curing. It could be ultraviolet light, radiation, moisture, catalyst or light or anything to help in the curing.

"a female transverse positioning lock"—portion of transverse positioning lock on the female end.

"a male transverse positioning lock"—portion of a transverse positioning lock on the male end.

"transverse positioning lock"—any type of mechanical structure that allows two pieces of ductwork to be rigidly joined together or locked together.

2—circular duct
4—crimped end
6—male bead
8—female end
10—gasket
12—leading edge
14—female bead
16—inside of female bead
18—flared portion

DESCRIPTION

FIG. 1 shows a circular duct 2. Male crimped end 4 has a male bead 6. The male crimped end 4 is designed to be inserted into female end 8 of another duct.

FIG. 2 shows section II-II of FIG. 1. Fast curing gasket 10 is on a leading edge 12 of the male bead 6. The fast curing gasket 10 is proximate to the male end 4.

Figure 3:
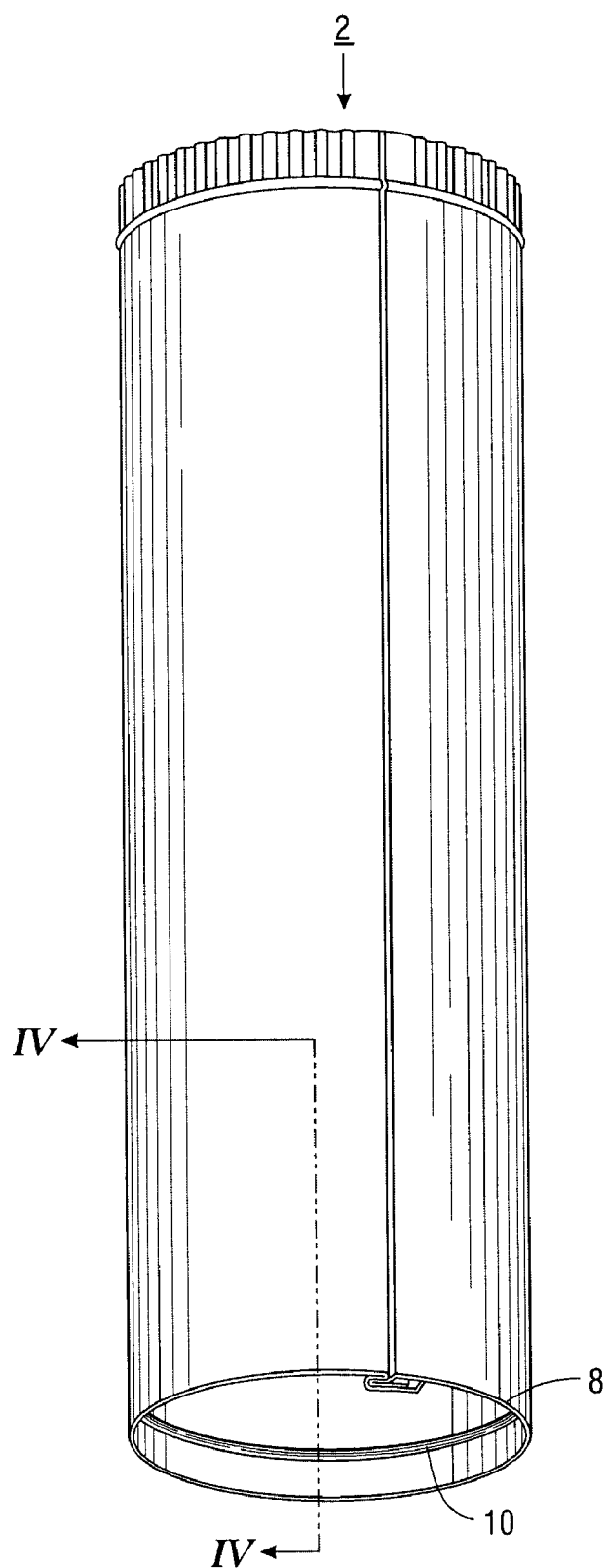
FIG. 3 is an isometric view of a single section of round ductwork showing a female end of a section of round ductwork.
Figure 4:
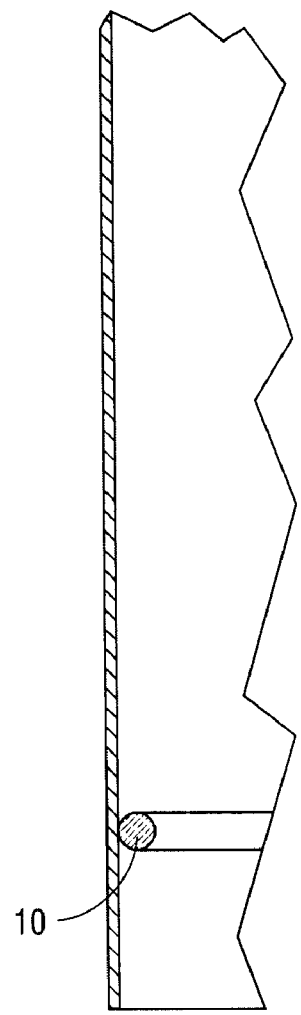
FIG. 4 is a section view of a female end of the ductwork along section IV-IV.

FIG. 3 shows a second embodiment of a circular duct 2. The fast curing gasket 10 is proximate to the female end 8.

FIG. 3 shows section IV-IV of FIG. 3. Fast curing gasket 10 is proximate to female end 8.

FIG. 5 shows a third embodiment of a circular duct 2. The female end 8 has a female bead 14.

FIG. 6 shows section VI-VI of FIG. 5. Fast curing gasket 10 is located on an inside of the female bead 16.

Figure 7:
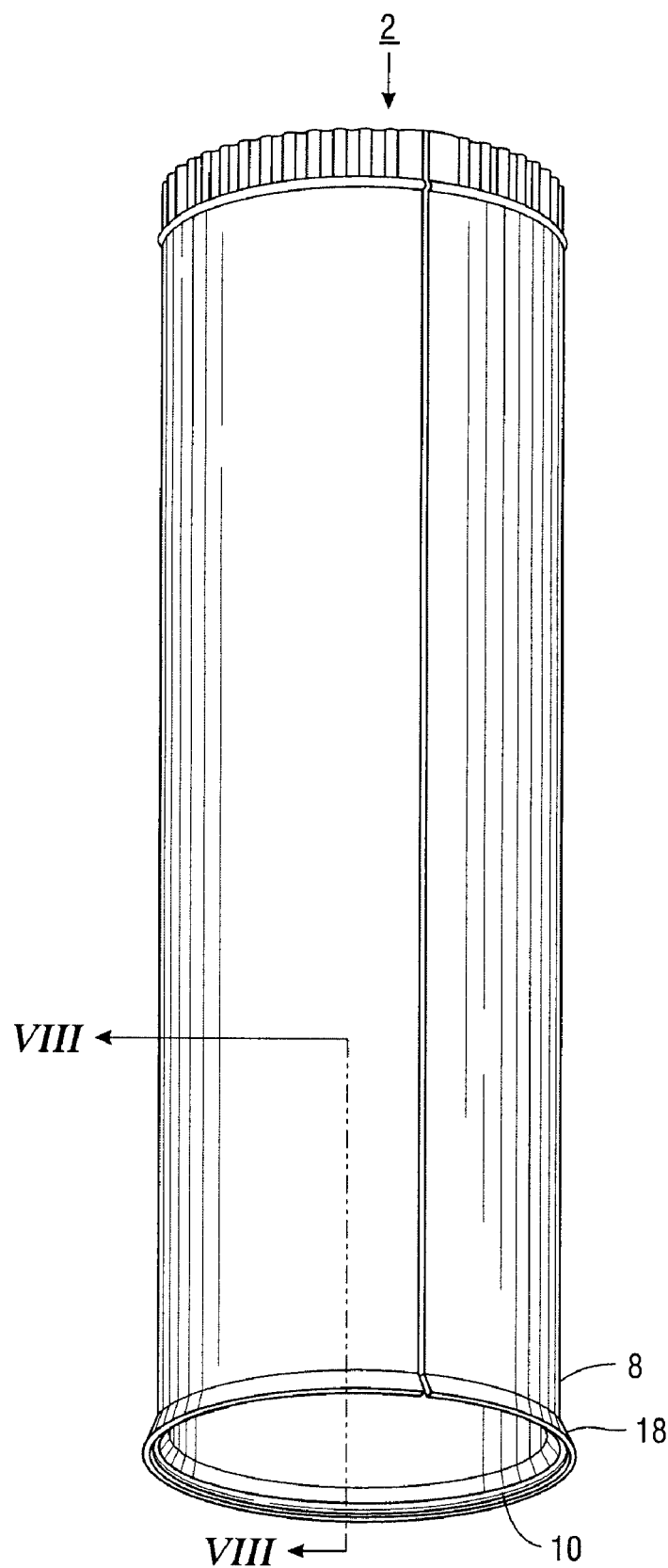
FIG. 7 is an isometric view of a single section of a ductwork having a flared female end.

FIG. 7 shows a fourth embodiment of a circular duct 2. Female end 8 has a flared portion 18.

Figure 8:
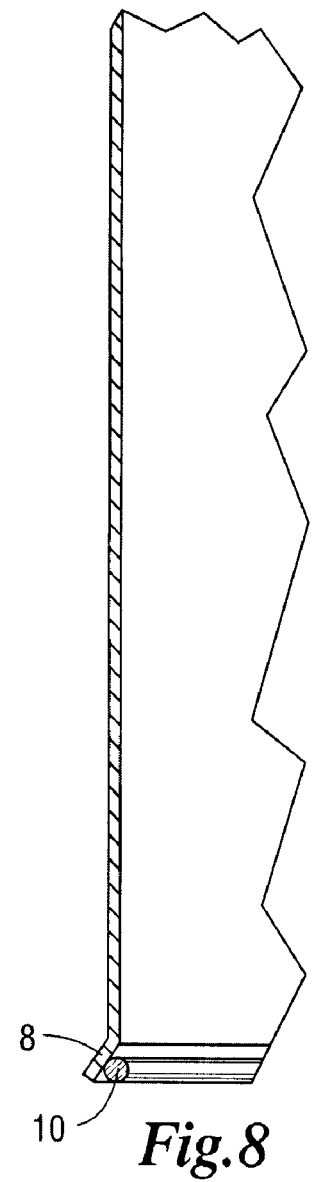
FIG. 8 is a section view of a female end of the ductwork having a flared female end along section VIII-VIII.

FIG. 8 is a cross section along VIII-VIII of FIG. 7. Fast curing gasket 10 is located in the flair portion 18. When a male crimped end 4 is inserted into the female end 8, the male crimped end 4 is able to enter without touching the gasket 10 and the gasket 10 seals on a non crimped part of the crimped male end 4.

Figure 9:
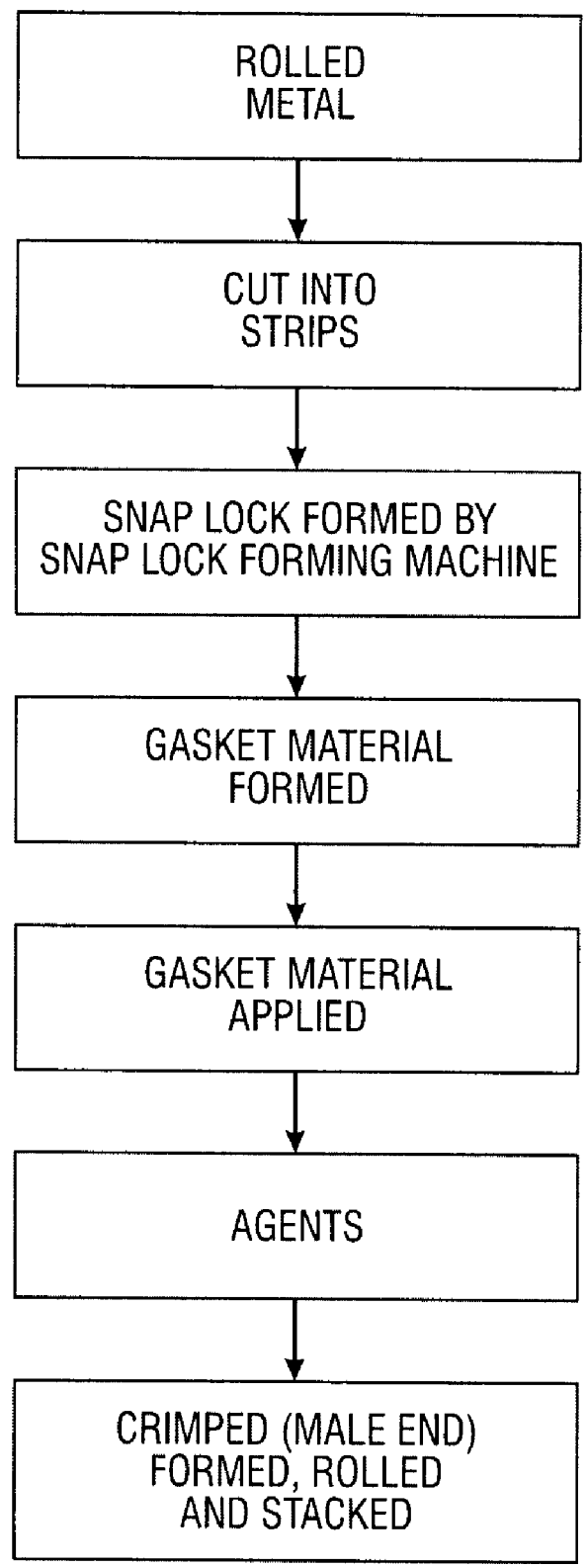
FIG. 9 is a block diagram of the method for forming ductwork.

FIG. 9 is a block diagram of the method of making the circular duct. Sheet metal is cut off of a master coil and travels down a conveyor. The sheet travels into a machine where it may or may not get clipped. The optional female bead can be put in the female portion or the flared portion could be created. Optionally at the same time the gasket may be put onto the sheet at that time. Paper or some sort of covering agent might be placed onto the gasket so that it doesn't stick to adjacent pieces of ducts during shipping thereby making it have little surface tack. By doing it this way it gives the fast curing gasket time to cure and if release paper is used it is a nice flat non stick surface at this point. The gasket may travel under ultraviolet lights to cure. Additionally other agents may be used to increase curing time or aid in curing of the gasket.

The sheet will then travel down the conveyor to the roll forming machines where the longitudinal snap locking mechanism is formed and optionally sealant is applied. This can be seen in application Ser. No. 11/739,238 which is hereby incorporated by reference in its entirety.

After the longitudinal snap locking mechanism is formed the male portion is formed by crimping an end of the sheet metal. At this same time the male bead is put on.

At this time applicants believe that the preferred embodiment would add the gasket after the longitudinal snap locking mechanism but prior to male portion being formed. The gasket material is Loctite Nuva Sil 5039 and preferably is foamed when used in this application. It is foamed by a Nordsen Ultra Foam Machine. The foaming helps with the compressibility of the gasket. The compressibility could be determined in a manner of hardness. The hardness could be measured by a durometer and have a hardness less than Shore A 75. Preferably it would have hardness of Shore OO in the range of 30-50.

A section on the end of the sheet metal may be notched out so that the longitudinal snap locking mechanism stops short of the bead so that it is not crushed when the longitudinal snap locking mechanism is formed. The notched out part helps to form a better seal because the male portion can fit better into the female portion.

The male and female sections can be put together and a sealed connection is created without having to take any further steps. When discussing a sealed connection it is meant to refer where minimal air leakage is present or less leakage than when there is no sealant in the connection.

FIG. 10 shows a first embodiment of a transverse positioning lock. On the female end 8 of a duct there can be a button lock 20 which in this embodiment is the female transverse positioning lock. The gasket 10 is on an inside of the female end 8 of the duct. The crimped male end 4 has a second bead 22 which in this embodiment is the male transverse positioning lock. The crimped male end 4 fits into the female end so that the second bead 22 slides over buttons lock 20 and locks the pipes together and ensures that the gasket lines up correctly.

FIG. 11 shows a second embodiment of a transverse positioning lock. The female end 8 of the duct has a female bead 14. The female end has a cut out 24 on the longitudinal seam. The combination of the female bead 14 and the cut out 24 in this embodiment is the female transverse positioning lock. The longitudinal snap locking mechanism can be seen in FIG. 11. A female part 26 of the longitudinal snap locking mechanism is removed up until the female bead 14 to create the cut out 24. The crimped male end 4 has a second bead 22 which in this embodiment is the male transverse positioning lock. The crimped male end 4 fits into the female end so that the second bead 22 slides into female bead 14 and locks the pipes together and ensures that the gasket lines up correctly and creates a proper seal. The cut out 24 allows the duct to radially expand or contract.

Various changes could be made in the above construction and method without departing from the scope of the invention as defined in the claims below. It is intended that all matter contained in the paragraphs above, as shown in the accompanying drawings, shall be interpreted as illustrative and not as a limitation.

We claim:

1. A circular cross-sectional sheet metal duct comprising:
   (a) a tube;
   (b) a female end on an end of the tube;
   (c) a male end on an opposite end of the tube extending essentially in the same direction as the tube and the male end having a smaller outer diameter than an inner diameter of the female end of the duct so that the male end can be inserted into a female end on another piece of circular cross-sectional sheet metal duct and when inserted the male end retains the same geometry with the tube as it had prior to being inserted;
   (d) a longitudinal snap locking mechanism through the length of the circular cross-sectional sheet metal duct that allows the duct to be opened and closed along a longitudinal seam;
   (e) an uncured gasket applied to the sheet metal during the forming of the sheet metal to form the male end and the female end such that the gasket when cured adheres to the duct and has minimal surface tack and is proximate to one of the ends so that when the circular cross-section sheet metal duct is joined to another piece of circular cross-sectional sheet metal duct a sealed joint is created between inner and outer circular surfaces of the two ducts.

2. The duct as recited in claim 1 wherein the end that the gasket is located proximate to is the male end and the gasket is located on a leading edge of the male end.

3. The duct as recited in claim 1 wherein the end that the gasket is located proximate to is the female end on an inside wall of the sheet metal duct.

4. The duct as recited in claim 1 wherein the gasket is cured using ultraviolet light.

5. The duct as recited in claim 1 wherein the uncured gasket applied to the sheet metal during the forming of the sheet metal is applied before the sheet metal is formed into a circular cross-sectional duct.

6. In a circular cross-sectional sheet metal duct having a male end and a female end for connection to other ducts and a longitudinal snap locking mechanism through the length of the ductwork that allows the duct to be opened and closed along a longitudinal seam the improvement comprising an uncured gasket applied to the sheet metal during the forming of the sheet metal to form the male end and the female end such that the gasket when cured adheres to the duct and has minimal surface tack and is proximate to one of the ends so that when joined to another piece of duct a sealed joint is created and including a bead on the female end of the duct wherein the end that the gasket is located proximate to is the female end and located on an inside of the female bead.

7. In a circular cross-sectional sheet metal duct having a male end and a female end for connection to other ducts and a longitudinal snap locking mechanism through the length of the ductwork that allows the duct to be opened and closed along a longitudinal seam the improvement comprising an uncured gasket applied to the sheet metal during the forming of the sheet metal to form the male end and the female end such that the gasket when cured adheres to the duct and has minimal surface tack and is proximate to one of the ends so that when joined to another piece of duct a sealed joint is created and including a flared portion on the female end and wherein the end that the gasket is located proximate to is the female end with the gasket located on the inside of the flared portion.

8. In a circular cross-sectional sheet metal duct having a male end and a female end for connection to other ducts and a longitudinal snap locking mechanism through the length of the ductwork that allows the duct to be opened and closed along a longitudinal seam the improvement comprising an uncured gasket applied to the sheet metal during the forming of the sheet metal to form the male end and the female end such that the gasket when cured adheres to the duct and has minimal surface tack and is proximate to one of the ends so that when joined to another piece of duct a sealed joint is created and wherein the gasket is foamed.

9. In a circular cross-sectional sheet metal duct having a male end and a female end for connection to other ducts and a longitudinal snap locking mechanism through the length of the ductwork that allows the duct to be opened and closed along a longitudinal seam the improvement comprising an uncured gasket applied to the sheet metal during the forming of the sheet metal to form the male end and the female end such that the gasket when cured adheres to the duct and has minimal surface tack and is proximate to one of the ends so that when joined to another piece of duct a sealed joint is created and including a female transverse positioning lock on the female end and a corresponding male transverse positioning lock on the male end.

10. A circular cross-sectional HVAC sheet metal duct comprising:
   (a) sheet metal formed into the shape of the duct having a female end, a male end, and a longitudinal snap locking mechanism that extends throughout the length of the duct;
   (b) a longitudinally oriented rectangular notch in the longitudinal snap locking mechanism on the female end whereby an end portion of the longitudinal snap locking mechanism is removed from the female end;
   (c) a female transverse positioning lock;
   (d) a male transverse positioning lock; and
   (e) a gasket positioned so that when the male end of the metal duct is inserted into the female end of an adjacent duct a seal is created and the notch formed in said female end permits unimpeded passage of said male end into said female end.

* * * * *

UNITED STATES PATENT AND TRADEMARK OFFICE
CERTIFICATE OF CORRECTION

| | | |
|---|---|---|
| PATENT NO. | : 7,992,904 B2 | Page 1 of 1 |
| APPLICATION NO. | : 12/133482 | |
| DATED | : August 9, 2011 | |
| INVENTOR(S) | : Vincent L. Bloom et al. | |

It is certified that error appears in the above-identified patent and that said Letters Patent is hereby corrected as shown below:

In the Specifications:

Column 1, Line 55 cancel "connections manufactured into the duct work" and insert --connections manufactured into the ductwork--

Column 2, Line 45 cancel "a single section of a ductwork" and insert --a single section of the ductwork--

Column 2, Line 55 cancel "Fig. 11 A" and insert --FIG. 11A--

Column 3, Line 27 cancel ""first state" means" and insert --"first state" - means--

Column 3, Line 52 cancel ""sealed joint" means" and insert --"sealed joint" - means--

Column 3, Line 67 cancel "any type of duct work" and insert --any type of ductwork--

In the Claims:

Column 6, Line 9 cancel "when the circular cross-section sheet metal duct" and insert --when the circular cross-sectional sheet metal duct--

Signed and Sealed this
Fourth Day of June, 2013

Teresa Stanek Rea
*Acting Director of the United States Patent and Trademark Office*